(12) United States Patent
Arnetoli

(10) Patent No.: US 8,615,887 B2
(45) Date of Patent: Dec. 31, 2013

(54) LINE-TYPE GRASS CUTTING HEAD WHICH CAN BE ALTERNATIVELY USED ON MACHINES WITH LEFT OR RIGHT ROTATION

(75) Inventor: Fabrizio Arnetoli, Florence (IT)

(73) Assignee: Arnetoli Motor S.r.l., Reggello (IT)

( * ) Notice: Subject to any disclaimer, the term of this patent is extended or adjusted under 35 U.S.C. 154(b) by 0 days.

(21) Appl. No.: 13/535,458

(22) Filed: Jun. 28, 2012

(65) Prior Publication Data
US 2012/0272535 A1 Nov. 1, 2012

Related U.S. Application Data

(62) Division of application No. 12/255,055, filed on Oct. 21, 2008, now Pat. No. 8,230,602.

(30) Foreign Application Priority Data

May 15, 2008 (IT) .................................... FI08A0097

(51) Int. Cl.
*A01D 34/416* (2006.01)
(52) U.S. Cl.
USPC ................................ 30/276; 30/347; 56/12.7

(58) Field of Classification Search
USPC ...................... 30/276, 347; 56/12.5, 12.7, 294
See application file for complete search history.

(56) References Cited

U.S. PATENT DOCUMENTS

| | | | |
|---|---|---|---|
| 5,526,572 A * | 6/1996 | Sugihara et al. | 30/276 |
| 5,765,287 A * | 6/1998 | Griffini et al. | 30/276 |
| 6,953,877 B2 * | 10/2005 | Hedges | 800/312 |
| 2002/0170183 A1* | 11/2002 | Sugihara et al. | 30/276 |
| 2009/0172955 A1* | 7/2009 | Morris et al. | 30/276 |

* cited by examiner

*Primary Examiner* — Phong Nguyen
(74) *Attorney, Agent, or Firm* — McGlew and Tuttle, P.C.

(57) ABSTRACT

A head including a housing (3A, 3B) for a winding spool (7) for winding the cutting line (F), provided with projections (15, 19) cooperating with teeth (17, 21) integral with the housing. The teeth and the projections are arranged in such a way so as to allow a stepped rotation of the spool with respect to the housing, when the spool is translated alternatively in opposite directions parallel to the axis of the head. The head includes a first series of teeth and a second series of teeth (21A, 21) which can be used alternatively and which are suitable each to allow the rotation of the spool (7) in one direction and to prevent the rotation in the opposite direction with respect to the housing.

4 Claims, 7 Drawing Sheets

LINE-TYPE GRASS CUTTING HEAD WHICH CAN BE ALTERNATIVELY USED ON MACHINES WITH LEFT OR RIGHT ROTATION

CROSS REFERENCE TO RELATED APPLICATIONS

This application is a divisional under 37 CFR 1.53(b) of application Ser. No. 12/255,055 filed Oct. 21, 2008, now U.S. Pat. No. 8,230,602 which claims the priority of Italian Patent Application FI2008A000097 of May 15, 2008. The entire contents of each application is hereby incorporated by reference in its entirety.

FIELD OF THE INVENTION

The present invention relates to a line-type grass cutting head of the type including a housing, in which a winding spool is arranged for winding the cutting line and offset teeth in order to allow stepped lengthening of the line by means of rotation of the spool with respect to the housing when the head is in rotation on the brush cutter on which it is applied.

BACKGROUND OF THE INVENTION

Many configurations of heads for cutting the vegetation are known, the so-called mowing or grass-cutting heads, wherein the cutting member is composed of a line in synthetic material, typically nylon®, which is radially projecting from the head and which cuts the surrounding vegetation due to the effect of the fast rotation of the head controlled by the drive shaft of the brush cutter on which the head is mounted. Usually, one or more cutting lines are wound on one or more spools housed inside the head to allow restoring the length of the portions of the cutting line, which project from the head, following breakage or wear due to the use.

In some heads of this type, lengthening is carried out by pressing the head against the ground without stopping the grass cutting operations, thanks to the presence of a particular elastic mechanism provided inside the housing in which the spool is arranged, or inside the spool itself. The elastic mechanism allows the spool to move axially with respect to the housing when the head is pressed against the ground. With this alternating movement in axial direction the spool is disengaged from a series of teeth or projections provided on the bottom of the housing and engages with a corresponding series of teeth arranged on the upper part of the housing with respective projections integral with the spool itself. The teeth and/or the projections are angularly offset in such a way that the alternating movement of the spool inside the head causes an angularly stepped forward movement of the spool with respect to the housing and hence a delivery of limited quantities of line towards the outside of the head thanks to the effect of the centrifugal force which acts on the members formed by the head during the rotation.

Heads of this type are described for example in WO-A-2006/036455, WO-A-2005/110685, WO-A-2004/062347, U.S. Pat. No. 5,765,287.

In some known embodiments, the mutually cooperating teeth and/or projections are shaped so as to allow, besides the lengthening of the line, winding of the line by manual rotation of the spool with respect to the housing. At this end, a series of teeth, integral with the spool or with the housing, must be shaped with an inclined surface, which allows the reciprocal rotation between spool and housing, overcoming the elastic force of the spring which elastically stresses the spool. Angular locking between spool and housing is thus ensured only in one direction of rotation and not in the other direction. Therefore, these heads can be mounted selectively only on brush cutters, which rotate clockwise or counter-clockwise (i.e. with left or right direction of rotation) based upon the configuration of the head. The same head cannot be mounted alternatively on brush cutters with right rotation and left rotation.

This involves some drawbacks both for manufacturers and for resellers, as well as for the users of this type of garden accessories. In fact, the manufacturers must have in their catalogue for each head the double version for brush cutters with right rotation and with left rotation respectively, or they will lose potential sales volumes, i.e. relinquishing selling their accessories to the customers having a brush cutter which rotates in opposite direction to the direction for which the head has been designed. Analogously, the resellers must have both head versions in stock. In any case, for the users there is the risk of buying a head not suitable for the type of brush cutter with which he/she is provided.

SUMMARY OF THE INVENTION

According to one aspect, one object of the present invention is to provide a head of the above mentioned type, which totally or at least partially overcomes some of the drawbacks of the known heads.

Substantially, in one embodiment the head includes a housing for a winding spool for winding the cutting line, provided with projections cooperating with teeth integral with the housing, the teeth and the projections being arranged such as to allow a stepped rotation of the spool with respect to the housing when the spool is translated alternatively in opposite directions parallel to the axis of the head, and wherein an elastic member elastically stresses the spool with respect to the housing. According to the invention, the head has a first series of teeth and a second series of teeth which can be used alternatively and which are suitable each to allow the rotation of the spool in one direction and to prevent the rotation of the spool in the opposite direction with respect to the housing.

The first series of teeth and the second series of teeth alternatively usable are provided on a reversible element designed so as to be mounted in two distinct positions with respect to the grass-cutting head, in order to cause alternatively the first or the second series of teeth to co-act with the spool. This reversible element can be a portion of the housing, for example a cover for closing the housing. In other embodiments the reversible element can be an additional element arranged inside the housing, on which two series of teeth are obtained. Preferably, in this case the reversible element can be coupled torsionally to the lower portion of the housing, although a configuration is possible, in which this reversible element is coupled to the upper portion of the housing. Upper and lower are intended as referred to the average position of the head during its use on a substantially horizontal surface. Besides torsional coupling means, also axial coupling means can be provided, for example by friction or interlock, in order to prevent axial displacements of the reversible element with respect to the housing.

According to another embodiment, instead of a reversible element carrying two series of teeth, two additional elements can be provided, which can be applied in the housing of the head, each provided with a series of teeth, and the two series of teeth being shaped in opposite manner for the above mentioned purposes. This solution is less advantageous, as it requires a greater number of components, is more expensive to be manufactured and more difficult to handle both during the production and packaging phase and during use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, FIGS. 1 to 10, in a first embodiment the head, indicated as a whole with reference number 1, includes a housing formed by a first portion or body 3A and by a second portion or cover 3B. In the illustrated embodiment, during use the head is mounted on the brush cutter so that the body 3A is above the cover 3B.

The cover 3B and the body 3A of the housing 3A, 3B can be mutually coupled in any suitable manner, for example also in an irreversible manner when the conformation of the spool allows new cutting line to be loaded without opening the head (as in the illustrated example). Vice versa, in some embodiments, such as for example in the embodiment illustrated in the drawing, the coupling is of the reversible type, and is carried out by means of elastic tabs formed on the body 3A, which engage in corresponding seats or slots 3C formed on the cover 3B. The coupling seats 3C are designed such that the cover 3B can be mounted with one or the other of the two faces facing the inside of the head for the purposes described below.

In this way, the housing formed by the portions 3A, 3B defines an inner volume 5 in which a spool 7 is housed. In some embodiments the spool has flanges 7A, 7B and a hub 7C. In the annular space between the flanges 7A, 7B and the hub 7C one or more cutting lines F of plastic material can be wound. Ends of the cutting line or lines F project from the housing 3A, 3B through bushings 9 arranged along the substantially cylindrical surface of the head 1. In the illustrated embodiment two bushings are shown, but it is understood that the number of bushings can be different. For example, using two cutting lines four bushings can be provided for projecting the four ends of the two lines.

In some embodiments, the bushings 9 are carried by the cylindrical wall of the upper portion or body 3A of the housing 3A, 3B. The line F is anchored to the spool 7 in any known manner. In the illustrated example, the spool has a diametric through hole which can be aligned with the bushings 9 such as to allow insertion of the line F through the bushings 9 and through the hole 7D of the spool 7 without opening the head. The line F can have also a great length to form a stock of line on the spool 7, which is wound by rotating the spool with respect to the housing 3A, 3B in the manner described below. There are also numerous other embodiments of the system for anchoring the line to the spool 7, and it must be understood that the present invention is not limited to this embodiment of the anchoring system for anchoring the line F to the spool 7. For example, the spool 7 can be provided with mutually separated and diametrically aligned holes, which can be aligned to the bushings 9 in order to insert and anchor in the holes the ends of two different lines making them passing through the bushings 9. In other embodiments the spool 7 can be provided with slots, cuts or other, inside which the ends of one or more lines F can be anchored, if required by extracting of the spool 7 from the housing 3A, 3B to perform said anchoring operation and then positioning the spool again in the housing to perform the winding.

The spool 7 is elastically stressed inside the housing 3A, 3B by means of an elastic member. In some embodiments said elastic member includes an helical compression spring 11, held between the upper wall of the upper portion or body 3A of the housing and an annular projection 7E provided in the hub 7C of the spool 7. In this way the spring 11 stresses the spool 7 downward, i.e. against the cover or lower portion 3B of the housing 3A, 3B.

In some embodiments, the spool 7 is provided with a portion 7F forming a push button which axially projects from an aperture 13 of the cover or lower portion 3B of the housing 3A, 3B. The button 7F is the actuating element to cause lengthening of the line F during the operation of the head 1, in the way which will be described hereunder. It also forms the handle for manual winding of the cutting line around the spool, as described below.

On the upper (in the drawing) face of the flange 7A of the spool 7 mutually angularly spaced projections 15 are provided, which co-act with teeth 17 (see in particular FIG. 2) provided on the inner face of the upper wall of the body 3A of the housing 3A, 3B. The teeth 17 can be formed by ribs of radial shape or of any other suitable shape. The projections 15 and the teeth 17 can have walls substantially parallel to the axis A-A of the head in order to form abutments which block the rotation of the spool 7 with respect to the housing 3A, 3B. The projections 15 of the spool 7 are caused to co-act with the teeth 17 of the housing 3A, 3B by compressing the spring 11 through a force f acting on the knob 7F, so that the spool 7 takes the raised axial position shown in FIG. 2. In this position projections 19 provided on the lower face of the lower flange 7B of the spool 7 are disengaged from the corresponding shaped teeth 21 provided on the cover 3B of the housing 3A, 3B and having a shape which is illustrated in greater detail in FIGS. 3 to 8B.

As can be understood in particular by comparing FIGS. 3, 4, 7A and 8A on one hand and the FIGS. 5, 6, 7B and 8B on the other hand, the lower portion or cover 3B of the housing 3A, 3B actually presents a double series of teeth on the two faces thereof. In the figures the two series are indicated again with the reference number 21 and the letter A and B for the two faces of the cover 3B.

Both the teeth 21A and the teeth 21B each has a front abutment surface B with an extension, which is substantially radial and parallel to the axis A-A of the head, and an inclined surface S which forms a ramp, ending with a portion S' substantially orthogonal to the axis of the head. The abutment surfaces B of the teeth 21A, 21B are angularly offset with respect to the upper teeth 17, whilst the projections 15, 19 integral with the spool 7 are angularly matching to each other. Vice versa, it is also possible to arrange the abutment surfaces of the teeth 17 in angular correspondence with the abutment surfaces B of the teeth 21 and to arrange the projections 15, 19 angularly offset. In both cases, the angular movement of the spool 7 with respect to the housing 3A, 3B is obtained by maintaining the head 1 in fast rotation on the brush cutter and pressing (arrow f) on the spool 7 in order to cause the disengagement of the projections 19 from the teeth 21 and the engagement of the projections 15 with the teeth 17 and vice versa. The angular offset of the projections/teeth allows, under the effect of the centrifugal force acting on the line F, the stepped rotation of the spool 7 with respect to the housing 3A, 3B and thus the release of the line toward the outside, by unwinding it from the reel obtained on the spool 7. This operating mode of the head to obtain lengthening of the line is known to those skilled in the art.

As the shaped teeth 21A, 21B are symmetrical with respect to a median plane orthogonal to the axis A-A of the cover 3B, depending upon the position taken by the cover 3B the abutments B and the inclined surfaces S will take opposite orientations, as it is understood by comparing FIGS. 7A, 8A and 7B, 8B. When the cover 3B is mounted with the orientation shown in FIGS. 7A, 8A, i.e. in the arrangement represented in FIG. 3 in an axonometric view and in FIG. 4 in a plane view, the head takes the configurations shown in FIG. 9 and it can be carried in fast rotation according to the arrow fs around its own axis (left or counter-clockwise rotation). In fact, in this case the projections 19 are pressed by the stress due to the effect of the rotation against the abutment surface B of the teeth 21A. The shape of the abutment surfaces of the projections 19 and of the abutment surfaces B of the teeth 21A is such that there is no reciprocal rotation between the housing 3A, 3B and the spool 7 under the stress generated by the rotation of the head 1 drawn by the drive shaft of the brush cutter (not shown). This prevents the spool from accidentally rotating with respect to the housing.

Lengthening of the line in order to replace any wear occurs, as already mentioned, by disengaging the projections 19 from the teeth 21A due to the effect of the pressure on the knob 7F and carrying one or more times the spool 7 in abutment with its projections 15 against the teeth 17 and then making it return in the original position under the effect of the compression spring 11.

Vice versa, in order to wind again a new line F around the spool 7 when this is necessary for example when the line expires, after having anchored the end of one or more lines to the spool in the above mentioned manner, the user shall only rotate the spool 7 in the winding direction with respect to the head formed by the housing 3A, 3B. At this end, he/she grips with one hand the knob 7F which projects inferiorly from the head 1 and rotates it in the winding direction with respect to the housing 3A, 3B which can be held with the other hand or engaged to the brush cutter. The rotation in the winding direction is allowed by the fact that in this case the projections 19 slide on the inclined surfaces S, S' of the teeth 21A. The axial stroke of the spool is in this case equal to the axial displacement imposed by the ramp formed by the surface S and is lesser that the stroke which carries, during the use and the release of the line, the projections 15 to cooperate with the teeth 17, so that the spool 7 can freely rotate around the axis A-A of the head for a sufficient number of revolutions so as to wind a desired quantity of line F on the spool.

Figure 1:
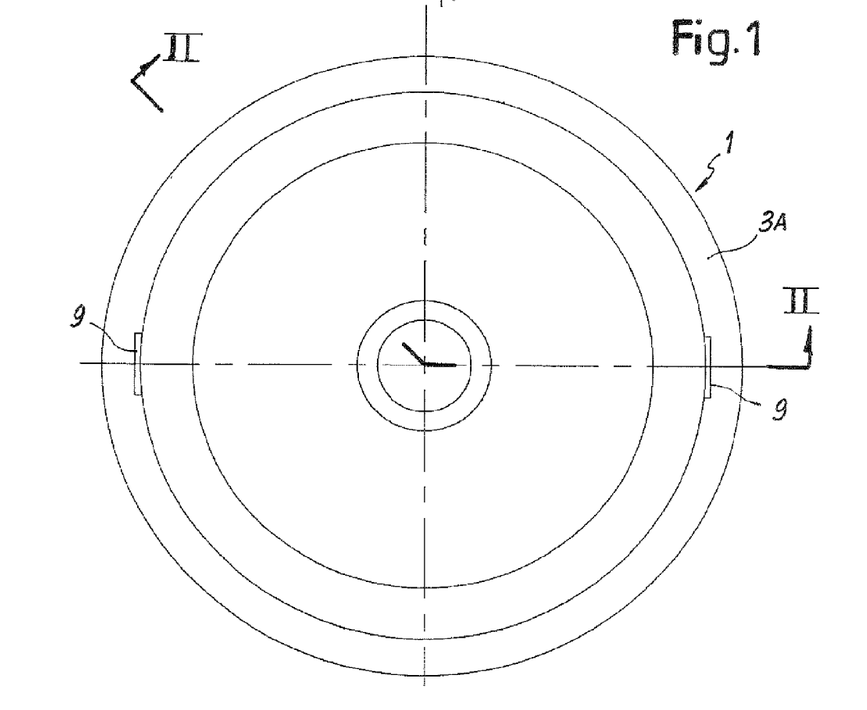
FIG. 1 is a view, according to line I-I of FIG. 2, of a head according to the invention.
Figure 2:
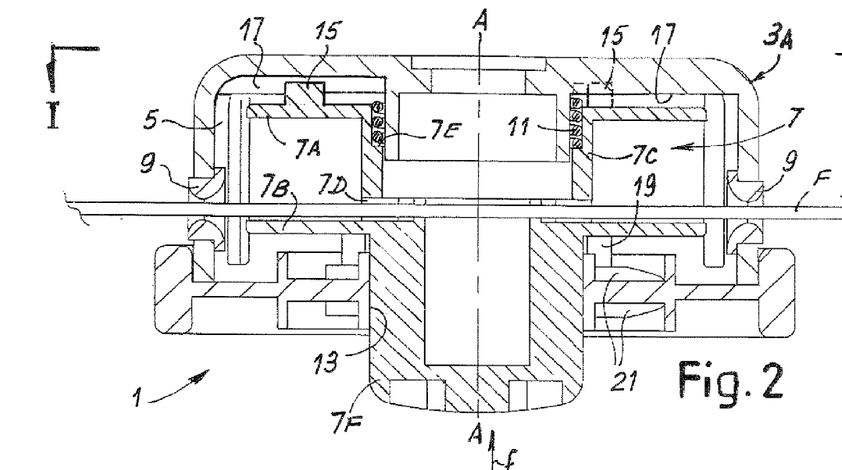
FIG. 2 is a sectional view according to line II-II of FIG. 1.
Figure 3:
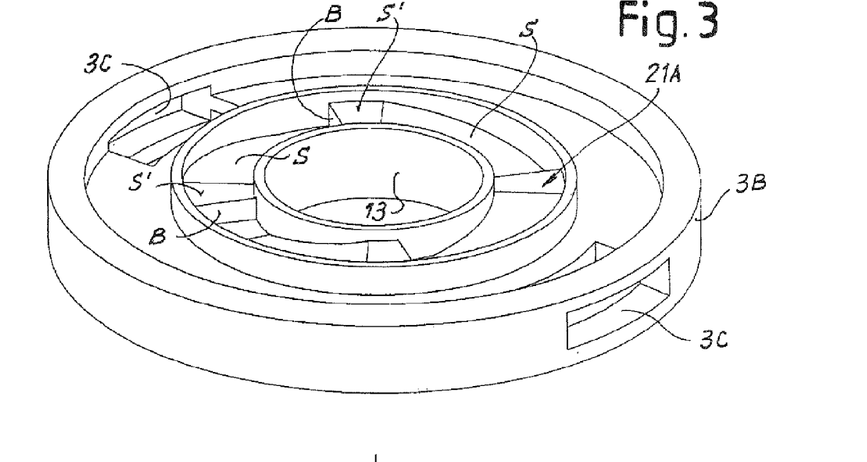
FIG. 3 is an axonometric view of a cover portion of the housing of the head of FIGS. 1 and 2 in a first orientation.
Figure 4:
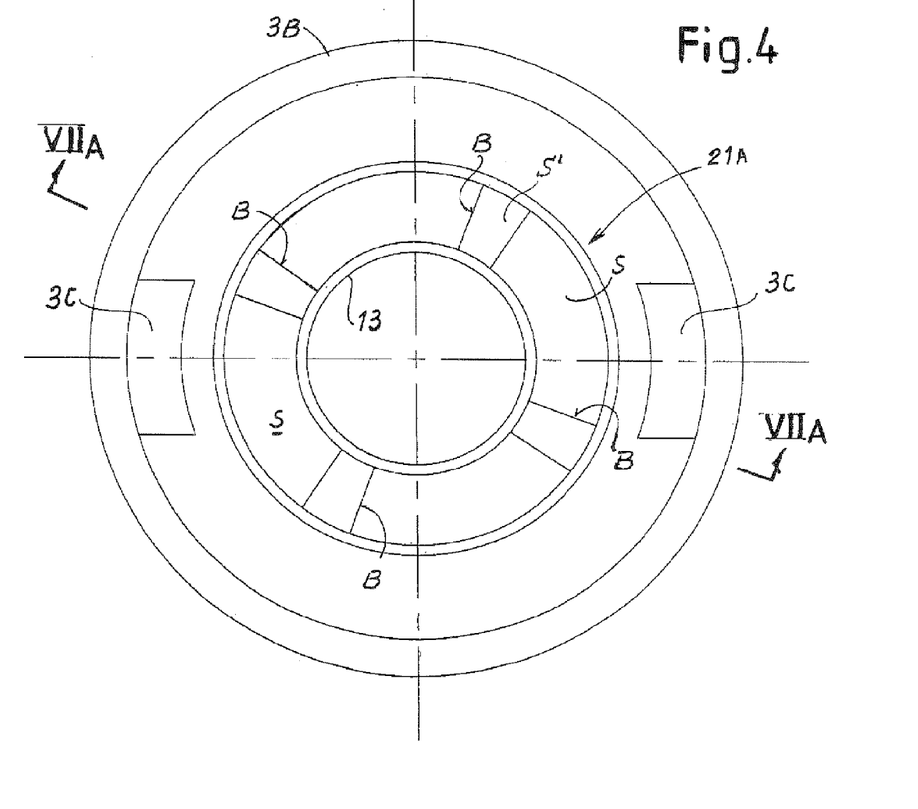
FIG. 4 is a view from above of a cover portion of the housing of the head of FIGS. 1 and 2 in a first orientation.
Figure 5:
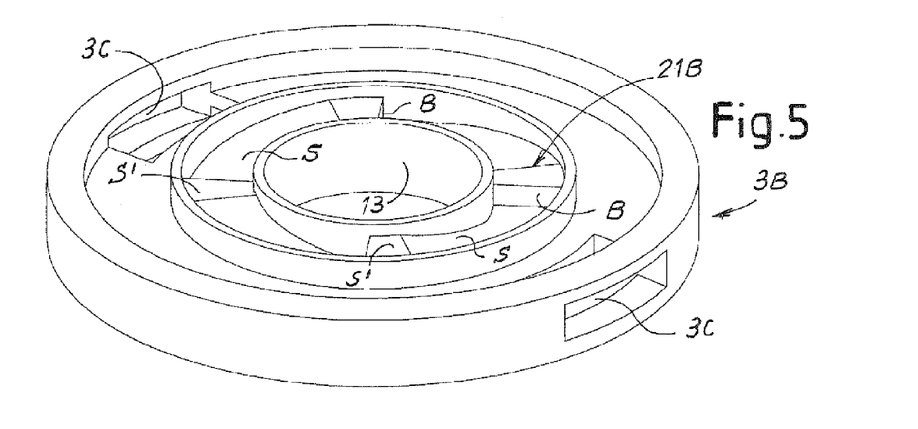
FIG. 5 is a view similar to FIG. 3, but with the cover reversed.
Figure 6:
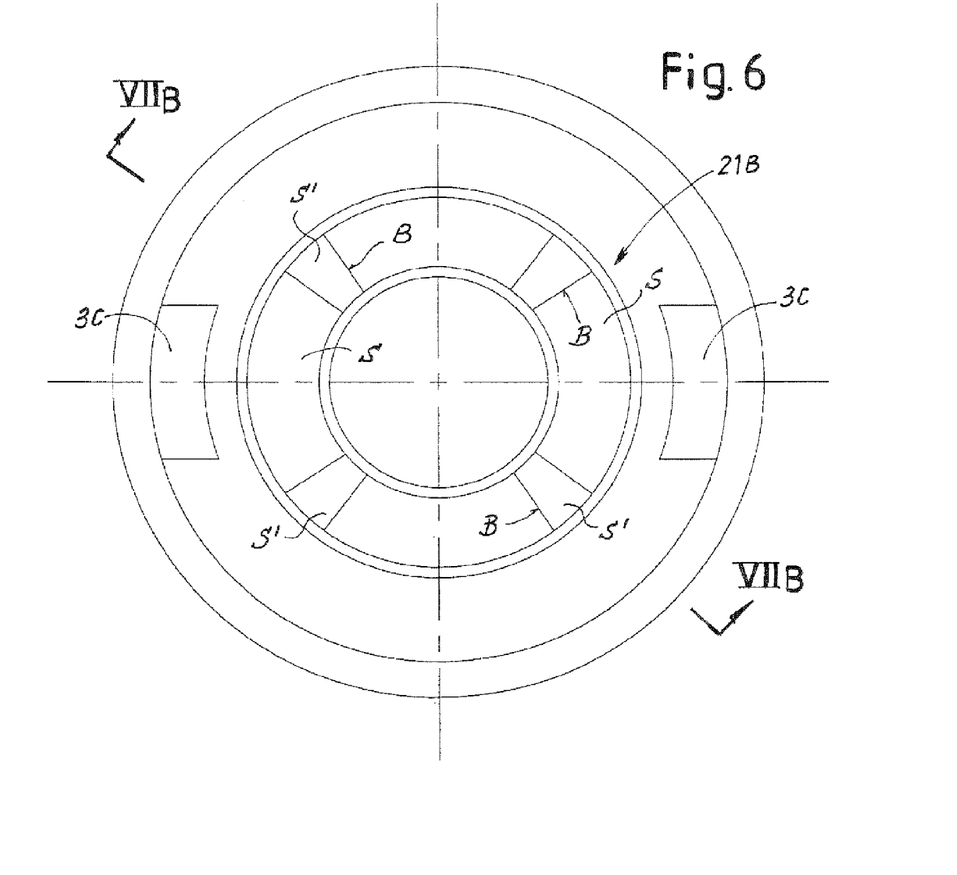
FIG. 6 is a view similar to FIG. 4, but with the cover reversed.
Figure 7A:
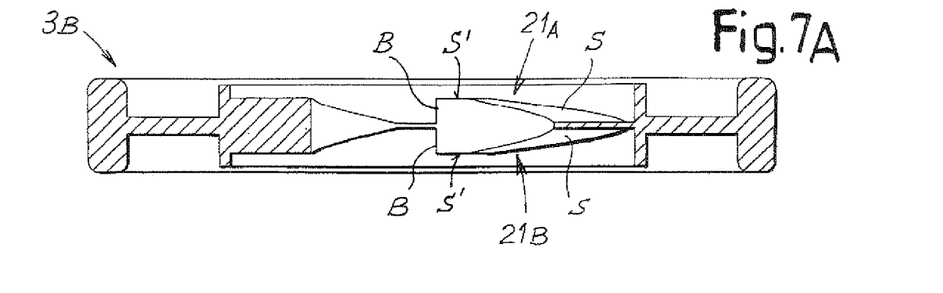
FIG. 7A is a diametric sectional view of the cover according to line VIIA-VIIA of FIG. 4.
Figure 7B:
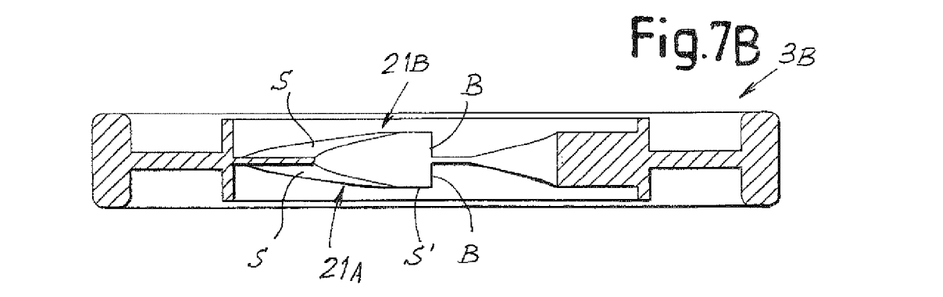
FIG. 7B is a diametric sectional view of the cover according to line VIIB-VIIB of FIG. 6.
Figure 8A:
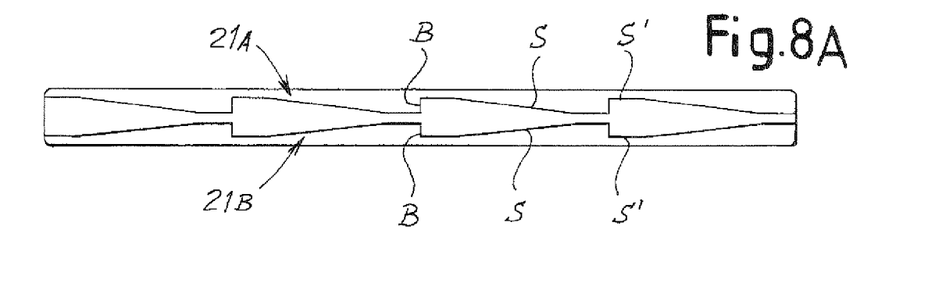
FIG. 8A is a plan view of the toothing of the cover of FIG. 4 in one possible position of use.
Figure 8B:
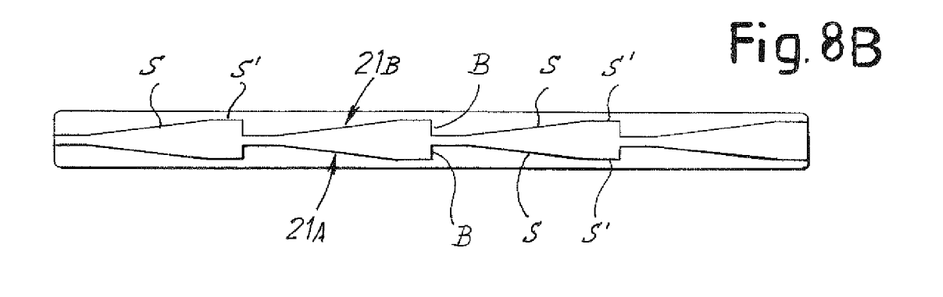
FIG. 8B is a plan view of the toothing of the cover of FIG. 6 in the another possible position of use.
Figure 9:
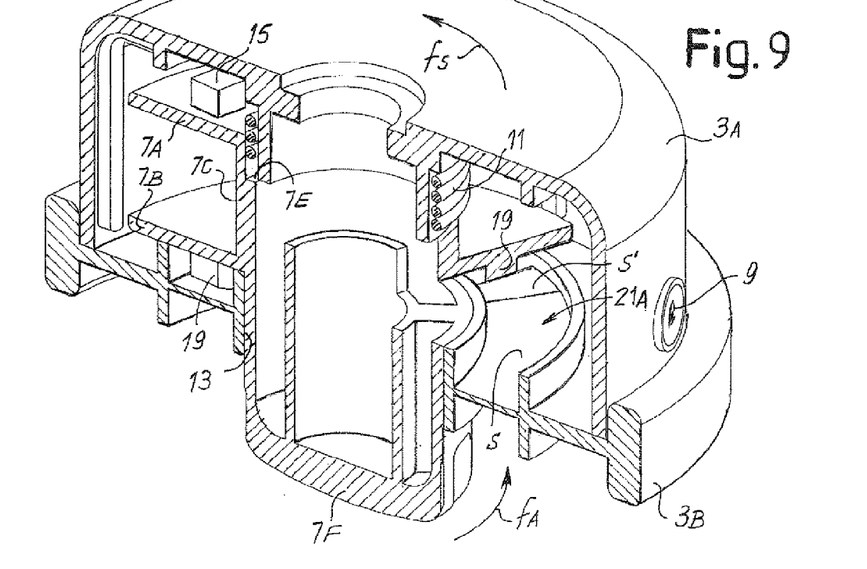
FIG. 9 is an axonometric sectional plane view of the head of FIG. 1 in one operating condition.

The rotation to wind the line occurs, when the head is mounted as illustrated in FIG. 9 and thus with the cover 3B oriented as the FIGS. 3,4, 7A, 7B, according to the arrow fA of FIG. 9 with respect to the body 3A of the housing.

Figure 10:
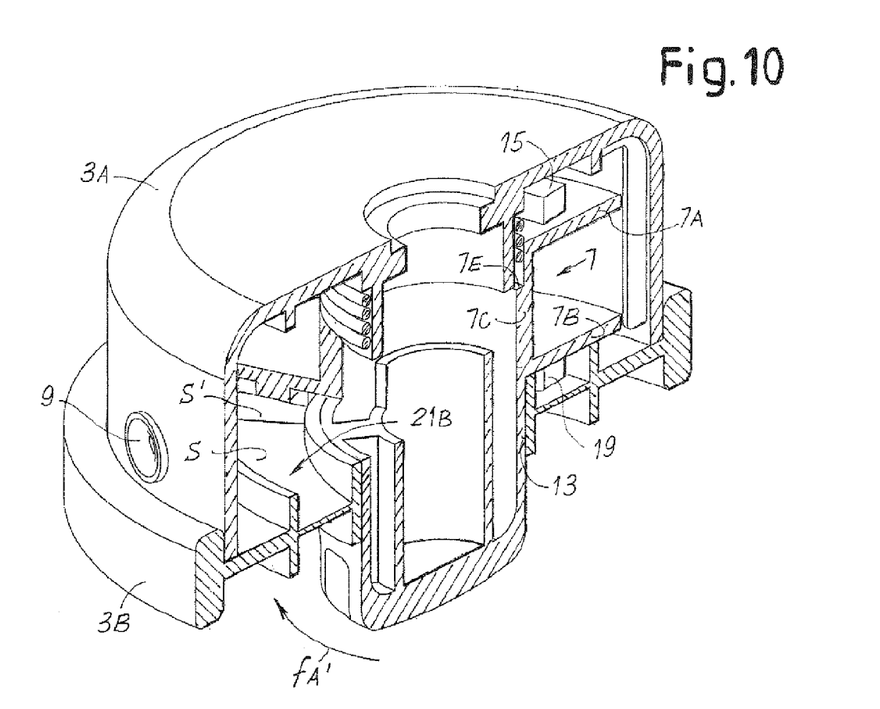
FIG. 10 is an axonometric sectional plane view of the head of FIG. 2 in another operating condition.

When the head 1 is to be mounted on a brush cutter which rotates in an opposite direction with respect to what is described above, it is sufficient to overturn the cover 3B and to mount it in the arrangement illustrated in FIG. 10, i.e. oriented as illustrated in FIGS. 5, 6, 7B, 8B. In this case the surfaces S, S' are oriented in opposite direction and therefore the rotation of the spool with respect to the housing is blocked in the direction, in which the spool tends to rotate due to the effect of the fast rotation of the head 1 during the use, whilst the rotation is allowed in opposite direction, according to the arrow fA' of FIG. 10, to allow unwinding of the cutting line.

In the example described above, the cover 3B constitutes therefore a reversible element, which can be mounted with the teeth 21A or with the teeth 21B oriented toward the inside of the housing and thus toward the spool 7, in order to allow the use of the head with brush cutters with right or alternatively left rotation.

Figure 11:
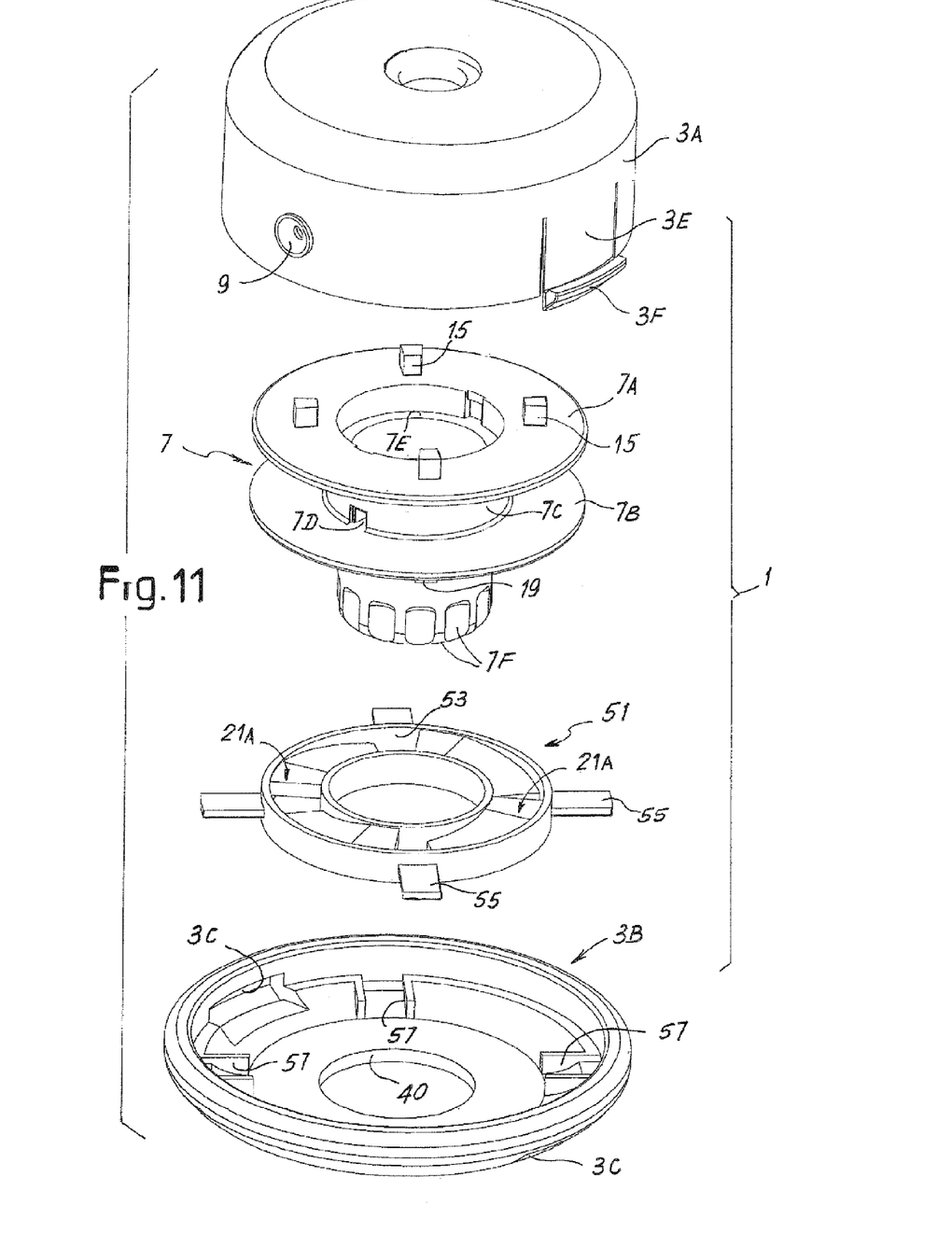
FIG. 11 is an exploded view of a second embodiment of a head according to the invention.
Figure 12:
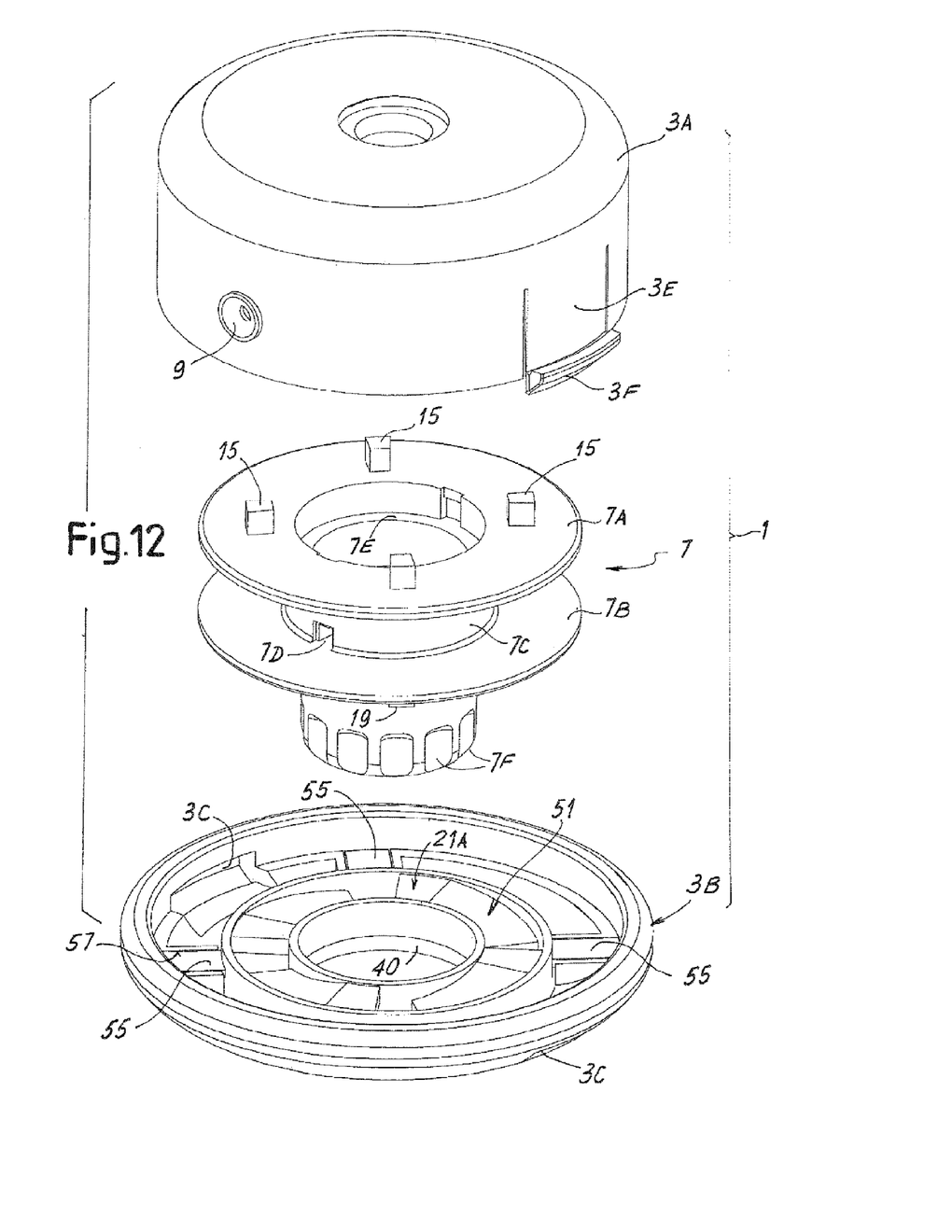
FIG. 12 is an exploded view of the head of FIG. 11, partially mounted.

In other embodiments the reversible element on which the teeth 21A, 21B are provided can be an additional component with respect to the elements forming the housing 3A, 3B, i.e. the body of the head. An embodiment of this type is shown for example in FIGS. 11 and 12, in which the same reference numbers indicate the same or equivalent parts to those in the previous example of embodiment, and they will not be described in particular detail herein.

In this embodiment the cover 3B is nearly cup shaped with a central hole 40 through which the knob 7F of the spool 7 projects. Windows 3C are also provided, which allow, contrary to what occurs in the embodiment illustrated in FIGS. 1 to 9, coupling of the cover 3B in a single position with respect to the body 3A, this latter being provided (as in the embodiment of FIGS. 1 to 9) with elastic tabs 3E with teeth 3F, which engage in the windows 3C to obtain the torsional coupling between the portion or body 3A and the portion or cover 3B of the housing 3A, 3B.

In the cover 3B a seat is provided for housing a reversible element 51, on which two series of teeth 21A, 21B are arranged, having substantially the same shape as the shape of the teeth illustrated in FIGS. 1 to 9. Therefore, the two series of teeth 21A, 21B on the two faces of the reversible element 51 have, in a plane development obtained by cutting the reversible element on a cylindrical surface which cuts the teeth 21A, 21B and laying this section in plane, the same shape illustrated in FIGS. 8A, 8B.

The reversible element 51 has as a whole an annular shape with two nearly cylindrical concentrical walls 53, 55, between which an annular space is defined, in which the teeth 21A, 21B are provided. Projections 55 are provided, radially projecting from the cylindrical wall 53, which constitute torsional coupling members for coupling the reversible element 51 and the cover 3B. In order to obtain the torsional coupling of the cover 3B and the reversible element 51, this latter is inserted inside the seat obtained in the cover 3B to take the position shown in FIG. 12, i.e. with the projections 55 inserted in spaces 57 on the inner surface of the cover 3B. By inserting the reversible element 51 alternatively with the teeth 21A or 21B facing the inside of the housing, it is possible to use the head on machines or brush cutters with right or left rotation of the drive shaft, alternatively.

While specific embodiments of the invention have been shown and described in detail to illustrate the application of the principles of the invention, it will be understood that the invention may be embodied otherwise without departing from such principles.

What is claimed is:

1. A line-type grass cutting head, comprising:
    a spool comprising a first set of projections and a second set of projections;
    a housing comprising a first housing portion and a second housing portion, said first housing portion comprising a plurality of first teeth, said first set of projections cooperating with said plurality of first teeth, said housing defining an inner volume, said inner volume receiving said spool;
    an elastic member elastically loading said spool with respect to said housing; and
    a reversible element arranged in said housing, said reversible element comprising a first side and a second side, said first side defining a plurality of second teeth, said second side defining a plurality of third teeth, said first side being opposite said second side, one of said plurality of second teeth and said plurality of third teeth facing the second housing portion and the other of said plurality of second teeth and said plurality of third teeth facing the spool arranged in the inner volume of the housing, said second set of projections cooperating with the one of said plurality of second teeth and said plurality of third teeth facing the spool.

2. A line-type grass cutting head as claimed in claim 1, wherein said reversible element comprises a torsional coupling member for torsionally coupling said reversible element to said second housing portion and said reversible element rotating with said second housing portion.

3. A line-type grass cutting head as claimed in claim 1, wherein said reversible element is arranged between said spool and said second housing portion.

4. A line-type grass cutting head, comprising:
    a spool for winding a cutting line, said spool comprising a first set of projections and a second set of projections;
    a housing comprising a first housing portion and a second housing portion, said first housing portion comprising a plurality of first teeth, said first set of projections cooperating with said plurality of first teeth, said housing defining an inner volume, said inner volume receiving said spool;
    an elastic member elastically loading said spool with respect to said housing; and
    a reversible element housed in said housing, said reversible element comprising a torsional coupling member for torsionally coupling said reversible element to said second housing portion and said reversible element rotating with said second housing portion, said reversible element comprising a plurality of second teeth and a plurality of third teeth, arranged on opposite sides of the reversible element, said reversible element for insertion in said housing with one of said plurality of second teeth and said plurality of third teeth facing the second housing portion and the other of said plurality of second teeth and said plurality of third teeth facing the spool arranged in the inner volume of the housing, said second set of projections cooperating with the one of said plurality of second teeth and said plurality of third teeth facing the inner volume of the housing.

* * * * *